No. 679,662. Patented July 30, 1901.
G. A. ALMORTH.
PROTRACTOR.
(Application filed Oct. 15, 1900.)
(No Model.)
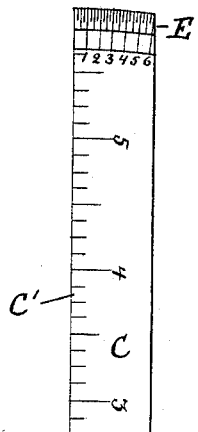
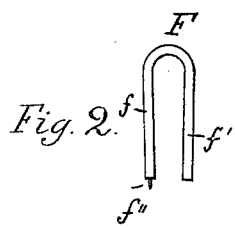
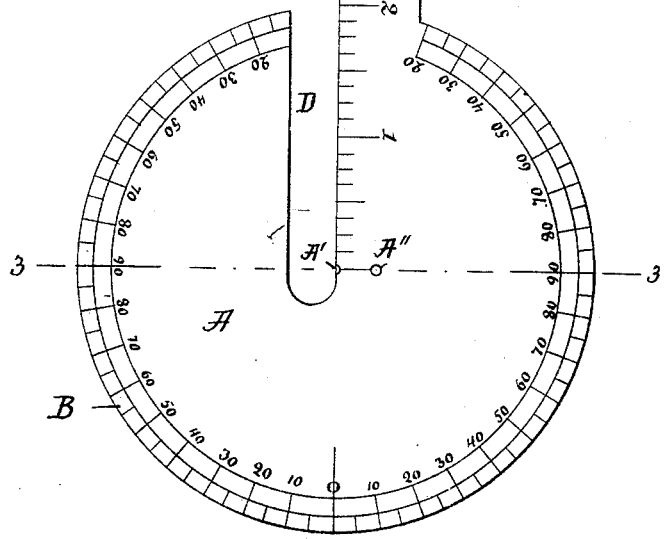
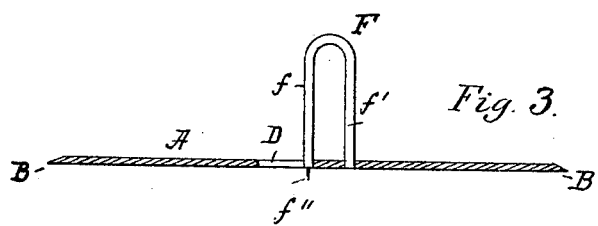
Fig. 1.
Fig. 2.
Fig. 3.
Witnesses.
Henry R. Pye.
Samuel Bradstreet.
Inventor.
Gustav A. Almorth.
by Alban Andrew
his atty.
THE NORRIS PETERS CO., PHOTO-LITHO., WASHINGTON, D. C.

UNITED STATES PATENT OFFICE.

GUSTAV A. ALMORTH, OF CAMBRIDGE, MASSACHUSETTS.

PROTRACTOR.

SPECIFICATION forming part of Letters Patent No. 679,662, dated July 30, 1901.

Application filed October 15, 1900. Serial No. 33,056. (No model.)

*To all whom it may concern:*

Be it known that I, GUSTAV A. ALMORTH, a citizen of the United States, residing at 30 Pearl street, Cambridge, in the county of Middlesex and State of Massachusetts, have invented new and useful Improvements in Protractors, of which the following is a specification.

This invention relates to improvements in protractors for the purpose of measuring and laying out angles on drawings or flat surfaces, and it is particularly well adapted for use by draftsmen, artisans, or scholars for such purposes, and it is carried out as follows, reference being had to the accompanying drawings, wherein—

Figure 1 represents a top plan view of the invention. Fig. 2 represents a detail side view of the detachable center-pin; and Fig. 3 represents a cross-section on the line 3 3 in Fig. 1, showing the said detachable center-pin attached to the protractor for holding the center thereof in position while drawing or laying out radial lines at different angles.

Similar letters refer to similar parts wherever they occur on the different parts of the drawings.

In the drawings, A represents a circular plate, preferably made of thin metal, but, if so desired, it may be made of other suitable material without departing from the essence of my invention. Said circular disk is provided on its periphery with a graduated scale B, divided in degrees and fractions of the circle, as shown. In one piece with said graduated disk is made a radial blade C, provided, preferably on one side, with a scale C', divided in inches and fractions thereof or metric measures, as shown.

D is a radial cut-away portion on the disk A adjacent to the blade C, as shown. The outer end of the blade C is provided with a scale E, divided in degrees of the circle and fractions, as shown in Fig. 1. At the center of the slotted disk A is a semicircular notch or recess A', adapted to receive one end $f$ of the U-shaped spring-wire centering-pin F, the other end $f'$ being adapted to be inserted into a perforation A'' in the disk A, as shown. $f''$ is a needle-point in the lower portion of the centering-pin portion $f$, as shown in Figs. 2 and 3, which is adapted to enter the drawing or other flat surface, so as to enable the instrument to be swung around its center in laying out or drawing radial lines at certain desired angles. The said center-pin device may readily be attached to the protractor when so desired and as readily removed when not desired for use.

The instrument is a very simple and useful one for the purpose of laying out or measuring angles and for measuring or laying out distances from a center point. It may also be useful for drawing circles, in which case the center-point device is temporarily attached to the central portion of the disk A and the blade C swung around the center point, while a pencil is held against the said blade at such distance from its center according to the radius of the circle that is to be drawn.

What I wish to secure by Letters Patent and claim is—

1. The herein-described protractor consisting of a graduated disk provided with a radial recess, eccentrically-arranged opening, and a centrally-arranged notch on one side of said recess, a radially-extending blade formed integral with said disk, provided with a graduated scale and a scale at the outer end thereof, combined with a detachable U-shaped centering-pin adapted to be mounted in said opening and engaging said notch, substantially as described.

2. The herein-described protractor consisting of a graduated disk having a radial recess, an eccentrically-arranged opening and a centrally-arranged notch on one side of said recess, combined with a detachable U-shaped centering-pin adapted to be mounted in said opening and engage said notch, substantially as described.

In testimony whereof I have hereunto set my hand in presence of two subscribing witnesses.

GUSTAV A. ALMORTH.

Witnesses:
ALBAN ANDRÉN,
CHARLES A. HARRIS.